(12) United States Patent
Jin et al.

(10) Patent No.: US 11,326,243 B2
(45) Date of Patent: May 10, 2022

(54) LOW-DENSITY HOT DIP GALVANIZED STEEL AND MANUFACTURING METHOD THEREFOR

(71) Applicant: BAOSHAN IRON & STEEL CO., LTD., Shanghai (CN)

(72) Inventors: Xinyan Jin, Shanghai (CN); Qi Yang, Shanghai (CN); Li Wang, Shanghai (CN); Guangkui Hu, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 372 days.

(21) Appl. No.: 16/304,957

(22) PCT Filed: Jun. 14, 2017

(86) PCT No.: PCT/CN2017/088262
§ 371 (c)(1),
(2) Date: Nov. 27, 2018

(87) PCT Pub. No.: WO2018/001098
PCT Pub. Date: Jan. 4, 2018

(65) Prior Publication Data
US 2020/0325568 A1    Oct. 15, 2020

(30) Foreign Application Priority Data
Jun. 28, 2016 (CN) .................. 201610486476.X

(51) Int. Cl.
*C23C 2/06* (2006.01)
*C21D 1/26* (2006.01)
(Continued)

(52) U.S. Cl.
CPC .................. *C23C 2/06* (2013.01); *C21D 1/26* (2013.01); *C21D 1/76* (2013.01); *C21D 8/0226* (2013.01);
(Continued)

(58) Field of Classification Search
None
See application file for complete search history.

(56) References Cited

U.S. PATENT DOCUMENTS 9,677,148 B2    6/2017  Tanaka et al.
2014/0251505 A1*  9/2014  Blumenau ............ C21D 6/005
148/287

(Continued)

FOREIGN PATENT DOCUMENTS

CN    101545069    9/2009
CN    104928568    9/2015
(Continued)

OTHER PUBLICATIONS

English language machine translation of JP-2010065314-A to Fushiwaki. Generated Jan. 28, 2021. (Year: 2021).*
(Continued)

*Primary Examiner* — Brian D Walck
(74) *Attorney, Agent, or Firm* — Lei Fang; Smith Tempel Blaha LLC

(57) ABSTRACT

Low-density hot dip galvanized steel, comprising a steel substrate (1) located at a core portion and a coating layer (3) located on the surface. An interface layer is disposed between the steel substrate (1) and the coating layer (3), the interface layer comprises an iron particle layer (4), iron particles dispersed on the steel substrate (1) and covering the steel substrate (1) are disposed in the iron particle layer (4), and the iron particles are covered by a first inhibition layer (5). The low-density hot dip galvanized steel contains element Al in a mass percentage of 3.0% to 7.0%. Correspondingly, the present invention also comprises a manufacturing method for the low-density hot dip galvanized steel. The
(Continued)

low-density hot dip galvanized steel has a low density, a high strength and high galvanizability and coating layer adhesion.

23 Claims, 3 Drawing Sheets

(51) Int. Cl.
    *C21D 1/76*     (2006.01)
    *C21D 8/02*     (2006.01)
    *C22C 38/04*     (2006.01)
    *C22C 38/06*     (2006.01)
    *C23C 2/02*     (2006.01)
    *C23C 2/40*     (2006.01)

(52) U.S. Cl.
    CPC .............. *C22C 38/04* (2013.01); *C22C 38/06* (2013.01); *C23C 2/02* (2013.01); *C23C 2/40* (2013.01); *C21D 2211/001* (2013.01); *C21D 2211/005* (2013.01)

(56) References Cited

U.S. PATENT DOCUMENTS

2014/0363697 A1* 12/2014 Kim .......................... C25D 5/48
                                                                428/659
2016/0222500 A1* 8/2016 Tanaka ................. C22C 38/002

FOREIGN PATENT DOCUMENTS

| | | | |
|---|---|---|---|
| CN | 105200441 | 12/2015 | |
| CN | 105908089 | 8/2016 | |
| JP | 2010065314 A | * 3/2010 | |
| WO | WO-2015037242 A1 | * 3/2015 | ........... C21D 8/0247 |

OTHER PUBLICATIONS

International Search Report and Written Opinion for PCT/CN2017/088262 dated Sep. 11, 2017.

* cited by examiner

LOW-DENSITY HOT DIP GALVANIZED STEEL AND MANUFACTURING METHOD THEREFOR

CROSS-REFERENCE TO RELATED APPLICATIONS

This application is a 371 U.S. National Phase of PCT International Application No. PCT/CN2017/088262 filed on Jun. 14, 2017, which claims benefit and priority to Chinese patent application no. 201610486476.X, filed on Jun. 28, 2016. Both of the above-referenced applications are incorporated by reference herein in their entireties.

TECHNICAL FIELD

The present invention relates to low-density steel, and more particularly to low-density hot dip galvanized steel.

BACKGROUND ART

With the increasing requirements of environmental regulations and energy conservation and consumption reduction, light weight is one of the development directions of automobile. The ways to achieve lightweight vehicles from a material perspective are as follows: using light alloys such as aluminum and magnesium instead of steel; using high-strength steel instead of traditional low-strength steel to achieve a reduction of the material; increasing the specific strength of steel by reducing the density of steel, i.e. developing low-density steel.

Since aluminum has a much lower density than steel, in the prior art, a reduction in material density was achieved by adding a certain amount of aluminum to the steel.

For example, a Chinese patent entitled "High strength interstitial free low density steel and method for producing said steel" (publication number: CN104220609A, publication date: Dec. 17, 2014) discloses a high strength interstitial free low density steel and manufacturing method therefor, wherein the steel has an Al content in a weight percentage of 6-9% in order to reduce the density.

Moreover, a Chinese patent entitled "Low density steel with good stamping capability" (publication number: CN101755057A, publication date: Jun. 23, 2010) discloses a hot-rolled ferrite steel sheet, wherein the content of Al is 6%≤Al≤0%.

In the continuous hot dipping process, the annealed strip steel is immersed in the zinc bath, and a layer of metal or alloy (such as Zn, Zn—Al, Zn—Al—Mg, etc.) is plated on the surface of the strip steel to improve the corrosion resistance of the strip steel. Hot-dip galvanizing of ordinary steel grades is a well-known technique. However, the hot dip galvanizing of the high-strength steel with high content of elements Si and Mn and the advanced high-strength steel has difficulties in galvanizability for the following reasons: although the annealing atmosphere before hot dipping is reductive to Fe, it is oxidative to Si and Mn, the oxide film of elements Si and Mn formed on the surface of the strip steel will seriously deteriorate the wettability of the galvanizing zinc to the strip steel, resulting in quality problems such as uncoated iron and poor adhesion of the coating layer.

The surface enrichment of element Si, among the alloying elements added to the steel, has the greatest influence on galvanizing. Therefore, when designing steel grades that require hot dipping, the Si content of the matrix is often controlled, or Si is replaced by other elements. It is known in the prior art that Al and Si have similar effects on stabilizing austenite. Therefore, Al is usually used instead of Si in hot dip galvanized transformation induced plasticity steel (TRIP steel) to improve the galvanizability of the strip steel, while the Al content is generally about 2%.

SUMMARY OF THE INVENTION

One of the objects of the present invention is to provide a low-density hot dip galvanized steel which has the advantages of low density, high strength, and good galvanizability.

In order to achieve the above object, the present invention provides a low-density hot dip galvanized steel, comprising a steel substrate located at a core portion of a steel and a coating layer located on the surface of the steel substrate; an interface layer is disposed between the steel substrate and the coating layer, the interface layer comprises an iron particle layer, iron particles dispersed on the steel substrate and covering the steel substrate are disposed in the iron particle layer, and the iron particles are covered by a first inhibition layer; the low-density hot dip galvanized steel contains element Al in a mass percentage of 3.0% to 7.0%.

In the low-density hot dip galvanized steel according to the present invention, the design principle of element Al is that element Al is a ferrite forming element. Since adding element Al can remarkably reduce the density of the steel sheet, the mass percentage of element Al in the present invention is not less than 3.0%. However, element Al having a mass percentage of more than 7.0% inhibits the formation of austenite. In addition, element Al significantly increases the stacking fault energy of austenite in steel. Therefore, element Al having a mass percentage of more than 7.0% inhibits that the residual austenite in the steel is induced to undergo martensitic transformation during deformation, making it difficult to obtain good strength and plasticity matching for the steel sheet. Therefore, the present invention defines the mass percentage of element Al to 3.0~7.0%.

Further, the surface of the low-density hot dip galvanized steel according to the present invention has an iron particle layer, which allows the low-density hot dip galvanized steel of the present invention have excellent galvanizability and coating layer adhesion.

Further, in the low-density hot dip galvanized steel according to the present invention, the steel substrate has an internal oxidized layer adjacent to the iron particle layer, and the internal oxidized layer contains oxides of Al.

Further, in the low-density hot dip galvanized steel according to the present invention, the internal oxidized layer further contains oxides of Mn.

Further, in the low-density hot dip galvanized steel according to the present invention, the internal oxidized layer has a thickness of 0.2~10 μm.

In the low-density hot dip galvanized steel of the present invention, when the thickness of the internal oxidized layer is less than 0.2 μm, the external oxidation of element Al cannot be effectively suppressed; and when the thickness of the internal oxidized layer is more than 10 μm, the formation property of the internal oxidized layer of the steel substrate may be affected. Therefore, preferably, the thickness of the internal oxidized layer is controlled to 0.2~10 μm.

Further, in the low-density hot dip galvanized steel of the present invention, the oxides of the internal oxidized layer exist in the grain boundary and inside the grain. The oxides in the internal oxidized layer are mainly Al oxides and Mn oxides, which are simultaneously distributed inside the grain and at the grain boundary of the internal oxidized layer.

Further, in the low-density hot dip galvanized steel of the present invention, the interface layer has a thickness of 0.1~5 μm.

In the low-density hot dip galvanized steel of the present invention, when the thickness of the interface layer is less than 0.1 μm, the adhesion of the coating layer is poor; and when the thickness of the interface layer is more than 5 μm, longer annealing holding time for forming the iron particle layer is needed. Therefore, the thickness of the interface layer of the present invention is controlled to 0.1~5 μm. Preferably, the thickness of the interface layer is controlled to 0.3~3 μm.

Further, in the low-density hot dip galvanized steel of the present invention, the iron particles have a particle size of 0.1~5 μm.

In the low-density hot dip galvanized steel of the present invention, when the particle size is less than 0.1 μm, the thickness and coverage area of the iron particles are less, and the adhesion of the coating layer is poor; and when the particle size is larger than 5 μm, the iron particle layer becomes too thick.

Further, in the low-density hot dip galvanized steel of the present invention, the iron particles cover 30% or more of the surface area of the steel substrate.

Further, in the low-density hot dip galvanized steel of the present invention, the maximum space between adjacent iron particles is no more than 10 times the average particle size of the iron particles.

In the above solution, if the maximum space between adjacent iron particles is more than 10 times the average particle size of the iron particles, the galvanizing zinc may not completely infiltrate the space between the iron particles during hot dip galvanizing, and the galvanizing zinc wettability and the adhesion of the zinc layer may also be affected. Accordingly, preferably, the present invention defines that the maximum space between adjacent iron particles is no more than 10 times the average particle size of the iron particles.

Further, in the low-density hot dip galvanized steel of the present invention, the portion not covered by iron particles on a surface of the steel substrate is covered by a second inhibition layer.

Further, in the low-density hot dip galvanized steel of the present invention, the thickness of the second inhibition layer is less than the thickness of the first inhibition layer.

Further, in the low-density hot dip galvanized steel of the present invention, the second inhibition layer contains elements Fe, Al, and Zn.

Further, in the low-density hot dip galvanized steel of the present invention, the first inhibition layer contains elements Fe, Al, and Zn.

In the low-density hot dip galvanized steel of the present invention, the first inhibition layer and the second inhibition layer are composed of Fe, Al, and Zn, wherein the first inhibition layer covers the surface of the iron particles contacting with the coating layer, and the second inhibition layer is the portion at which the surface of the steel substrate is not covered by the iron particles. This is because when the steel sheet is immersed in the zinc bath, element Al and a small amount of element Zn in the zinc bath firstly react with the steel sheet Fe covered by the iron particle layer on the surface to form a first inhibition layer; and a small amount of a second inhibition layer containing Fe, Al, and Zn also may be formed on the surface of the substrate at the portion not covered by iron particles on a surface of a substrate or at the position of the gap between the iron particles, but the thickness thereof is thinner than the inhibition layer on the surface of the iron particles.

Further, in the low-density hot dip galvanized steel of the present invention, the microstructures of the steel substrate are ferrite and residual austenite.

Further, in the low-density hot dip galvanized steel of the present invention, the phase ratio of the residual austenite is 6~30%.

Further, in the low-density hot dip galvanized steel of the present invention, the mass percentage of element C in the residual austenite is not less than 0.8%.

In the low-density hot dip galvanized steel of the present invention, C is an important solid solution strengthening element that promotes austenite formation. In the low-density steel rich in element Al, when the mass percentage of C in the residual austenite is less than 0.8%, the content and mechanical stability of residual austenite are relatively low, resulting in a low strength and low ductility of the steel sheet. Therefore, in the low-density hot dip galvanized steel of the present invention, the C content in the residual austenite is not less than 0.8%.

Further, the density of the low-density hot dip galvanized steel of the present invention is less than 7500 kg/m$^3$.

Further, in the low-density hot dip galvanized steel of the present invention, the mass percentages of the chemical elements of the steel substrate are: C: 0.25~0.50%, Mn: 0.25~4.0%, Al: 3.0~7.0%, and the balance being Fe and other unavoidable impurities.

The above-mentioned unavoidable impurities mainly refer to elements S, P and N, and can control that P≤0.02%, S≤0.01%, N≤0.01%.

The design principles of each chemical element in the low-density hot dip galvanized steel are as follows:

C: C is an important solid solution strengthening element that promotes austenite formation. In the low-density steel rich in Al, when the mass percentage of C is less than 0.25%, the content and mechanical stability of residual austenite are relatively low, resulting in a low strength and low ductility of the steel sheet; when the mass percentage of C is more than 0.5%, lamellar carbides and carbide particles distributed at the ferrite grain boundaries are coarse, thereby reducing the rolling deformation ability of the steel sheet. Therefore, in the present invention, the C mass percentage is controlled to 0.25~0.50%.

Mn: Mn can increase the stability of austenite, reduce the critical cooling rate of steel during quenching and improve the hardenability of steel. Mn also can improve the work hardening properties of steel, thereby increasing the strength of the steel sheet. However, an excessively high Mn content causes Mn segregation in the slab and a significant band-like structure distribution in the hot-rolled sheet, thereby reducing the ductility and bending properties of the steel sheet. Moreover, an excessively high Mn content tends to cause cracks in the hot-rolled sheet during cold rolling deformation. Therefore, in the present invention, the mass percentage of Mn is controlled to 0.25~4.0%.

Element Al is a ferrite forming element. Since the density of the steel sheet can be remarkably reduced by the addition of element Al, the mass percentage of element Al in the present invention is not less than 3.0%. However, element Al having a mass percentage of more than 7.0% inhibits the formation of austenite. In addition, element Al may significantly increase the stacking fault energy of austenite in steel. Therefore, element Al having a mass percentage of more than 7.0% inhibits that the residual austenite in the steel is induced to undergo the martensitic transformation during deformation, making it difficult to obtain good strength and plasticity matching for the steel sheet. Therefore, in the present invention, the mass percentage of element Al is defined to 3.0~7.0%.

P: P is a solid solution strengthening element. However, P increases the cold brittleness of the steel, reduces the plasticity of the steel and deteriorates the cold bending properties and the weldability. Therefore, in the present invention, the mass percentage of P is defined to 0.02% or less.

S: S causes the steel to be hot brittle, reduces the ductility and toughness of the steel, deteriorates the weldability and reduces the corrosion resistance of the steel. Therefore, in the present invention, the mass percentage of S is defined to 0.01% or less.

N: N and Al form AlN, and the columnar dendrites can be refined during solidification. However, when the N content is too high, the formed coarse AlN particles affect the ductility of the steel sheet. In addition, excess AlN reduces the thermoplasticity of the steel. Therefore, in the present invention, the mass percentage of N is defined to 0.01% or less.

Further, the low-density hot dip galvanized steel of the present invention may further contain at least one of elements Si, Ti, Nb, V, Cr, Mo, Ni, Cu, B, Zr and Ca.

Further, the low-density hot dip galvanized steel of the present invention has an elongation of more than 25% and a tensile strength of more than 800 MPa.

Further, in the low-density hot dip galvanized steel of the present invention, the coating layer has a thickness of 5~200 µm. When the strip steel coming out of a molten zinc bath passes through an air knife, the thickness of the coating layer is limited to 5~200 µm by controlling the flow rate of the air knife and the angle between the air knife and the strip steel.

Another object of the present invention is to provide a method for manufacturing the low-density hot dip galvanized steel according to the present invention, by which any one of the above-described low-density hot dip galvanized steels can be produced.

In order to achieve the above object, the present invention provides a method for manufacturing the low-density hot dip galvanized steel, comprising the steps of:

(1) manufacturing a strip steel;
(2) continuous annealing of the strip steel: heating to a soaking temperature of 750~950° C. and then holding 30~600 s, wherein dew point of annealing atmosphere is −15° C.~20° C.;
(3) hot dipping.

In the present technical solution, the soaking temperature and the holding time of the continuous annealing in the step (2) are defined mainly for forming an iron particle layer on the surface of the steel sheet after continuous annealing. The reasons for controlling the soaking temperature to 750° C.~950° C. and the holding time to 30~600 s are as follows: at a soaking temperature lower than 750° C. or with a holding time less than 30 s, martensite in steel substrate of low-density hot dip galvanized steel does not sufficiently undergo austenite reverse phase transformation to form austenite particles, carbides in steel matrix of low-density hot dip galvanized steel do not completely dissolve to form austenite particles, and strip-shaped high-temperature ferrite cannot sufficiently dynamic recrystallize and refined, so that the iron particle layer on the surface of the steel sheet after annealing is not sufficiently formed, which is detrimental to the wettability of the zinc bath, the galvanizability and the adhesion of the coating layer. When the soaking temperature is higher than 950° C. or the holding time is more than 600 s, austenite grains in the microstructures of the steel sheet substrate are coarsened after the soaking treatment, and the austenite stability in the steel is lowered, resulting in a decrease in the residual austenite content in the steel sheet matrix after annealing and a decrease in residual austenite stability. Consequently, the mechanical properties of the steel sheet after annealing deteriorate. When the soaking temperature is higher than 950° C. or the holding time is more than 600 s, the particle size of iron particles on the surface of the steel sheet after annealing becomes too large and the internal oxidized layer becomes too thick, which is detrimental to the forming properties of the surface of the steel sheet.

In addition, the technical solution of the present invention defines that the dew point of annealing atmosphere is −15° C.~20° C. Within such dew point range, the annealing atmosphere is reductive to Fe, and thus the iron oxide is reduced. When the dew point of the annealing atmosphere is lower than −15° C., the above annealing atmosphere is still oxidative to element Al in the strip steel, and the Al in the strip steel forms a continuous dense $Al_2O_3$ film on the surface of the strip steel, which affects the properties of the steel sheet during hot dip galvanizing. When the dew point of the annealing atmosphere is higher than 20° C., the oxygen potential in the annealing atmosphere is too high, the diffusion ability of O atoms into the steel matrix increases, and the internal oxidized layer formed with alloying elements such as Al and Mn on the surface of the steel sheet is too thick, which affects the forming properties of the surface of the steel sheet. Preferably, in the present technical solution, in order to achieve a better implementation effect, the dew point of annealing atmosphere is controlled to −10~0° C.

Preferably, in the present technical solution, in order to achieve a better implementation effect, the holding time of soaking is controlled to 30~200 s.

Further, in the step (1) of the method for manufacturing a low-density hot dip galvanized steel of the present invention, the casting slab is heated at 1000~1250° C. with a holding time of 0.5~3 h and a finishing rolling temperature is controlled to 800~900° C., and then the hot-rolled sheet is coiled at 500~750° C., and the hot-rolled coil is uncoiled and then subjected to pickling and cold rolling, wherein the cold rolling reduction is 30~90%.

In the method for manufacturing a low-density hot dip galvanized steel according to the present invention, the heating temperature in the step (1) is defined to 1000~1250° C. for the following reasons: when the heating temperature is higher than 1250° C., the slab of the steel sheet is over-fired and the grain structures in the slab are coarse, resulting in a decrease in hot workability, and the ultra-high temperature causes severe decarburization on the surface of the slab; when the heating temperature is lower than 1000° C., the finishing rolling temperature of the slab after high-pressure water descaling and initial rolling is too low, resulting in excessive deformation resistance of the slab, which makes it difficult to manufacture a steel sheet having a predetermined thickness and without surface defects.

In the method for manufacturing a low-density hot dip galvanized steel according to the present invention, the holding time in the step (1) is defined to 0.5~3 h for the following reasons: when the holding time exceeds 3 h, the grain structures in the slab of the steel sheet are coarse and the decarburization on the surface of the slab is serious; when the holding time is less than 0.5 h, the inside of the slab is not uniform.

In the method for manufacturing a low-density hot dip galvanized steel according to the present invention, the finishing rolling temperature in the step (1) is defined to 800~900° C. in order to complete the hot rolling of the casting slab. When the finishing rolling temperature is too low, the deformation resistance of the slab is too high, so that it is difficult to manufacture hot-rolled steel sheet and cold-rolled steel sheet having the required thickness and without surface and edge defects. Moreover, when the finishing rolling temperature in the present invention is lower than 800° C., the hot-rolled strip-shaped high-temperature ferrite inside the slab cannot sufficiently recover and cannot recrystallize and refine. Since the slab temperature naturally decreases during the hot rolling process after discharging the slab, it is difficult to control the finishing rolling temperature to be higher than 900° C.

In the method for manufacturing a low-density hot dip galvanized steel according to the present invention, in the step (1), it is defined to coil the hot-rolled sheet at 500~750° C. When the coiling temperature is higher than 750° C., it is difficult to prevent the hot roll rolling strip from being flatly coiled, and the unevenness of the microstructures of the head, middle and tail materials of the hot-rolled coil increases; when the coiling temperature is lower than 500° C., the high tensile strength of the hot-rolled coil may cause difficulty in cold rolling.

In the method for manufacturing a low-density hot dip galvanized steel according to the present invention, the cold rolling reduction in the step (1) is defined for the following reasons: the hot-rolled steel sheet after pickling is subjected to cold rolling deformation to obtain a predetermined thickness, a cold rolling reduction of more than 30% increases the austenite formation rate in the subsequent annealing process, contributes to the formation of deformed high-temperature ferrite and improves the microstructure uniformity of annealed steel sheet, thereby improving the ductility of the annealed steel sheet. However, when the cold rolling reduction is more than 90%, the deformation resistance of the material due to work hardening is very high, making it extremely difficult to prepare a cold-rolled steel sheet having a predetermined thickness and a good plate type. Therefore, the cold rolling reduction of the low-density hot dip galvanized steel of the present invention is controlled to 30~90%.

Preferably, in the present technical solution, in order to achieve a better implementation effect, the cold rolling reduction is 50~80%.

Further, in the step (2) of the method for manufacturing a low-density hot dip galvanized steel according to the present invention, the atmosphere of the heating section and the holding section is a mixed gas of $N_2$ and $H_2$, wherein the volume content of $H_2$ is 0.5~20%. Preferably, in the present technical solution, in order to achieve a better implementation effect, the volume content of $H_2$ is 1~5%.

In the step (2) of the method for manufacturing a low-density hot dip galvanized steel according to the present invention, the atmosphere of the heating section and the soaking section is a mixed gas of $N_2$ and $H_2$, wherein the volume content of $H_2$ is 0.5~20%. The purpose of adding $H_2$ is to reduce the iron oxide on the surface of the strip steel. The heating rate is 1~20° C./s.

Further, in the step (3) of the method for manufacturing a low-density hot dip galvanized steel according to the present invention, the strip steel after continuous annealing is cooled to the temperature of the strip steel entering into the molten zinc bath, wherein the cooling rate is 1~150° C./s, and the temperature of the strip steel entering into the molten zinc bath is 0~20° C. higher than the temperature of zinc bath; the strip steel is then immersed in the zinc bath of a molten zinc bath for hot dipping; wherein the temperature of zinc bath is 30~60° C. higher than the melting point of the components of the selected zinc bath.

In the method for manufacturing a low-density hot dip galvanized steel according to the present invention, the cooling rate is controlled to 1~150° C./s for avoiding austenite decomposition of the steel sheet during cooling. In the present technical solution, the temperature of the strip steel entering into a molten zinc bath is 0~20° C. higher than the temperature of zinc bath, which is beneficial to maintain the thermal balance of the molten zinc bath. An excessively high temperature of the strip steel entering into the molten zinc bath accelerates the dissolution rate of Fe in the strip steel to the zinc bath, increases the amount of dross, and causes an increase in the diffusion rate between the zinc bath and the strip steel, leading to a risk of forming a zinc-iron alloy phase. If the temperature of the strip steel entering into the molten zinc bath is too low, it is not conducive to the reaction of Al and Fe in the zinc bath to form a inhibition layer, thereby affecting the adhesion of the zinc layer. Wherein, the temperature of zinc bath is 30~60° C. higher than the melting point of the components of the selected zinc bath for the following reason: if the temperature of zinc bath is too high, the reaction between the zinc bath and the strip steel will increase, resulting in an increase in the Fe content of the zinc bath; if the temperature of zinc bath is too low, it will affect the reaction between Al in the zinc bath and Fe on the substrate surface for forming the inhibition layer.

Preferably, in the present technical solution, in order to achieve a better implementation effect, the cooling rate is controlled to 10~50° C./s.

Preferably, in the present technical solution, in order to achieve a better implementation effect, the temperature of the strip steel entering into the molten zinc bath is 0~10° C. higher than the temperature of zinc bath.

Preferably, in the present technical solution, in order to achieve a better implementation effect, the temperature of zinc bath is 420~480° C.

Further, the method for manufacturing a low-density hot dip galvanized steel according to the present invention, wherein, in the step (3), mass percentages of components in zinc bath are: 0.10≤Al≤6%, 0<Mg≤5%, and the balance being Zn and other unavoidable impurities.

In the method for manufacturing a low-density hot dip galvanized steel according to the present invention, the reasons for adding 0.1~6% Al to the zinc bath are as follows: when the strip steel is immersed in molten zinc bath, the Al in the zinc bath firstly reacts with the strip steel to form a inhibition layer, thereby suppressing the diffusion between Zn and Fe, and avoiding the formation of a zinc-iron alloy phase which adversely affects the forming properties of the coating layer. The addition of Mg to the zinc bath is advantageous for further improving the corrosion resistance of the coating layer. However, when the Mg content exceeds 5%, the surface oxidation is increased, which is disadvantageous for production. Therefore, in the technical solution of the present invention, Mg is defined to 0~5%. Moreover, if the content of Al and Mg is too high, the hardness of the coating layer is increased and the forming property of the coating layer is deteriorated.

The beneficial effects of the low-density hot dip galvanized steel of the present invention are as follows:

(1) By controlling the dew point of the annealing atmosphere, the formation of external oxidation of $Al_2O_3$ on the surface of the low-density steel is suppressed and it is converted to internal oxidation of the surface layer of the substrate, and iron particles are formed on the surface layer of the substrate, thereby improving the galvanizability of the strip steel and adhesion of the coating layer.

(2) The low-density hot dip galvanized steel of the present invention has an elongation of more than 25%, a tensile strength of more than 800 MPa, and a density of less than 7500 kg/m$^3$.

In addition to the above advantages, the method for manufacturing a low-density hot dip galvanized steel according to the present invention can be implemented on the existing continuous hot dipping production line for high-strength steel without large adjustments, and has good promotion and application prospects.

DETAILED DESCRIPTION OF THE INVENTION

The low-density hot dip galvanized steel and manufacturing method thereof of the present invention will be further explained and illustrated with reference to Drawings and specific Examples. However, the explanation and illustration do not constitute undue limitations of the technical solutions of the present invention.

Figure 1:
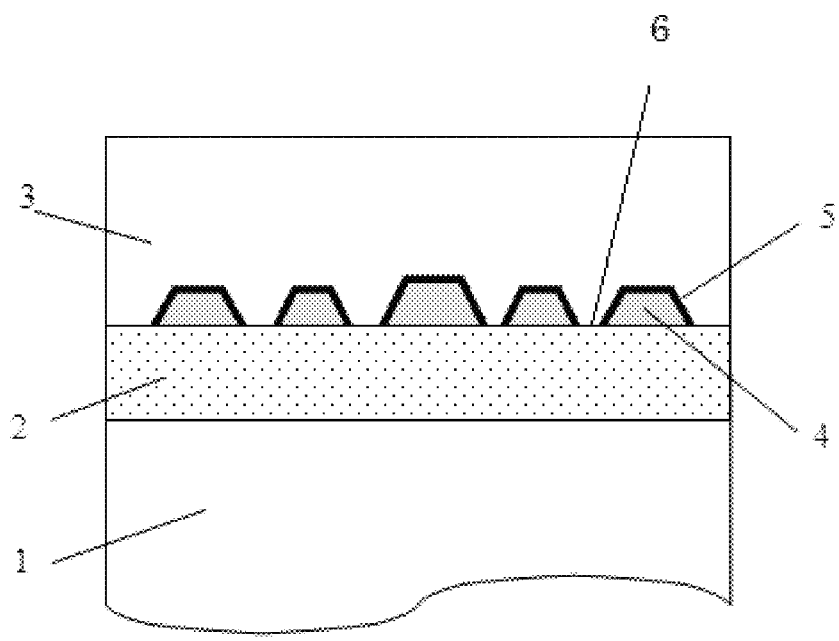
FIG. 1 is a schematic diagram showing the structure of the low-density hot dip galvanized steel of the present invention.

FIG. 1 shows the structure of the low-density hot dip galvanized steel of the present invention. As shown in FIG. 1, the low-density hot dip galvanized steel of the present invention comprises a steel substrate 1 and a coating layer 3 on the surface, wherein an interface layer is disposed between the steel substrate 1 and the coating layer 3, the interface layer comprises an iron particle layer 4. Wherein, iron particles are covered by a first inhibition layer 5, and a second inhibition layer 6 does not cover iron particles. The steel substrate 1 further has an internal oxidized layer 2 adjacent to the iron particle layer 4.

Figure 2:
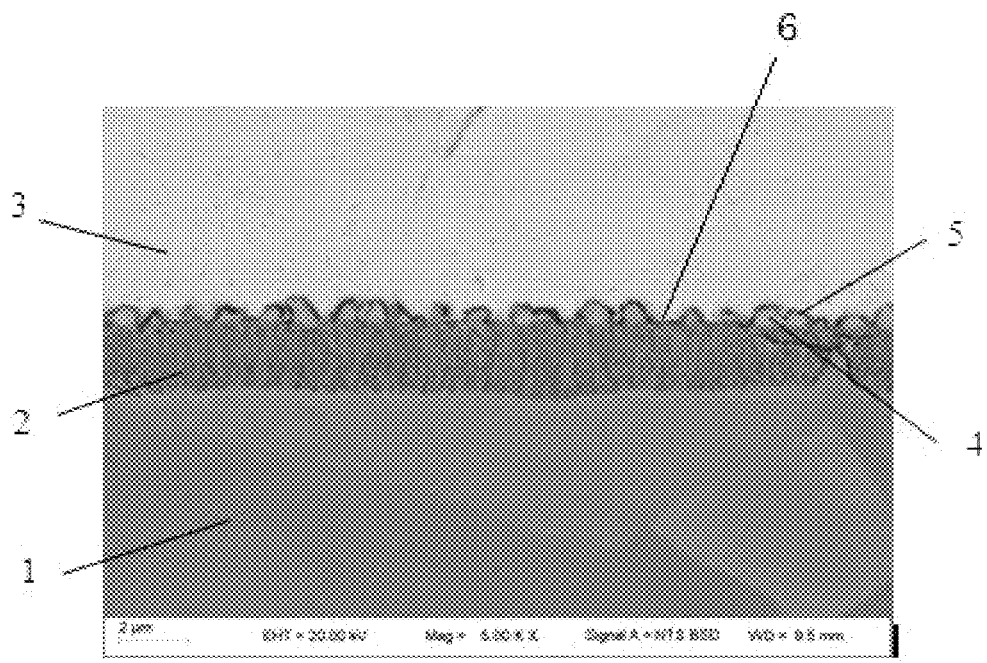
FIG. 2 shows the cross-sectional metallographic structure of the low-density hot dip galvanized steel of the present invention.

FIG. 2 shows the cross-sectional metallographic structure of the low-density hot dip galvanized steel of the present invention. As shown in FIG. 2, in the low-density hot dip galvanized steel of the present invention, the formation of the external oxidation of the iron particle layer 4 on the surface of $Al_2O_3$ is suppressed by controlling the dew point of the annealing atmosphere and it is converted to internal oxidation of the internal oxidized layer 2; the first inhibition layer and the second inhibition layer are composed of Fe, Al, and Zn; the first inhibition layer covers a surface of the iron particles contacting with the coating layer, and the second inhibition layer is the portions at which the surface of the steel substrate is not covered by the iron particles. This is because when the steel sheet is immersed in the zinc bath, element Al and a small amount of element Zn in the zinc bath firstly react with the steel sheet Fe covered by the iron particle layer to form a first inhibition layer; and a small amount of a second inhibition layer containing Fe, Al, and Zn may be formed on the surface of the substrate at the portion not covered by the iron particles on the substrate surface or at the position of the gap between the iron particles, but the thickness thereof is thinner than the first inhibition layer on the surface of the iron particles. Wherein, the thickness of the internal oxidized layer 2 is 0.2~10 μm, and the oxides of the internal oxidized layer 2 exist in the grain boundary and inside the grain, the thickness of interface layer is 0.1~5 μm.

Examples A1-A16 and Comparative Examples B1-B6

Table 1 lists the mass percentages of the chemical elements in components of the low-density hot dip galvanized steels of Examples A1-A16 and of the conventional steel sheets of Comparative Examples B1-B6.

TABLE 1

| (wt %, the balance is Fe) | | | | | | |
|---|---|---|---|---|---|---|
| | C | Mn | Al | Si | N | S | P |
| Component I | 0.37 | 1.1 | 4.1 | 0.31 | 0.0025 | 0.002 | 0.004 |
| Component II | 0.45 | 2 | 6.1 | — | 0.0040 | 0.003 | 0.007 |
| Component III | 0.34 | 2.8 | 5.2 | — | 0.0027 | 0.003 | 0.007 |

As can be seen from Table 1, the mass percentage ranges of chemical elements in components I, II, and III are controlled as follows: C: 0.25~0.50%, Mn: 0.25~4.0%, Al: 3.0~7.0%, P≤0.02%, S≤0.01%, N≤0.01%, and Si is added to the component I.

The low-density hot dip galvanized steels of Examples A1-A16 and the conventional steel sheets of Comparative Examples B1-B6 were prepared by the following steps:

(1) manufacturing strip steel: the steel was smelted according to the composition of Table 1, the casting slab was heated at 1000~1250° C. with a holding time of 0.5~3 h and a finishing rolling temperature is controlled to 800~900° C., and then the hot-rolled sheet was coiled at 500~750° C., and the hot-rolled coil was uncoiled and then subjected to pickling and cold rolling, wherein the cold rolling reduction was 30~90%.

(2) continuous annealing of the strip steel: heating to a soaking temperature of 750~950° C. and then holding 30~600 s, wherein heating rate was 1~20° C./s, the atmosphere of the heating section and the holding section was a mixed gas of $N_2$ and $H_2$, wherein the volume content of $H_2$ was 0.5~20%, dew point of annealing atmosphere was −15° C.~20° C.

(3) hot dipping: the strip steel after continuous annealing was cooled to the temperature of the strip steel entering into the molten zinc bath, wherein the cooling rate was 1~150° C./s, and the temperature of the strip steel entering into the molten zinc bath was 0~20° C. higher than the temperature of zinc bath; the strip steel was then immersed in the zinc bath of a molten zinc bath for hot dipping; wherein the temperature of zinc bath was 30~60° C. higher than the melting point of the components of the selected zinc bath. Wherein, mass percentages of components in zinc bath are: 0.10≤Al≤6%, 0<Mg≤5%, and the balance is Zn and other unavoidable impurities.

Table 2 lists the specific process parameters of the low-density hot dip galvanized steels of Examples A1-A16 and of the conventional steel sheets of Comparative Examples B1-B6.

TABLE 2

| | | Step (1) | | | | | Step (2) | |
|---|---|---|---|---|---|---|---|---|
| | Component | Heating temperature (° C.) | Holding time (h) | Finishing rolling temperature (° C.) | Coiling temperature (° C.) | Cold rolling reduction (%) | Soaking temperature (° C.) | Holding time of soaking (s) |
| A1 | I | 1178 | 2.0 | 807 | 659 | 60 | 776 | 267 |
| A2 | I | 1178 | 2.0 | 807 | 659 | 60 | 815 | 356 |
| A3 | I | 1178 | 2.0 | 807 | 659 | 60 | 932 | 103 |
| A4 | I | 1178 | 2.0 | 807 | 659 | 60 | 837 | 135 |
| A5 | I | 1178 | 2.0 | 807 | 659 | 60 | 900 | 32 |
| A6 | I | 1178 | 2.0 | 807 | 659 | 60 | 833 | 129 |
| A7 | I | 1232 | 1.6 | 830 | 621 | 60 | 815 | 30 |
| A8 | I | 1232 | 1.6 | 830 | 621 | 60 | 792 | 289 |
| A9 | I | 1232 | 1.6 | 830 | 621 | 45 | 812 | 287 |
| A10 | I | 1161 | 1.7 | 817 | 729 | 45 | 867 | 189 |
| A11 | I | 1039 | 0.6 | 801 | 521 | 45 | 868 | 157 |
| A12 | I | 1150 | 0.5 | 898 | 647 | 45 | 817 | 221 |
| A13 | II | 1116 | 1.8 | 854 | 516 | 60 | 790 | 281 |
| A14 | II | 1232 | 0.6 | 830 | 621 | 60 | 850 | 191 |
| A15 | III | 1208 | 0.8 | 828 | 656 | 60 | 814 | 40 |
| A16 | III | 1179 | 2.1 | 888 | 594 | 60 | 827 | 303 |
| B1 | I | 1178 | 2.0 | 807 | 659 | 60 | 837 | 135 |
| B2 | I | 1070 | 3.0 | 835 | 545 | 60 | 815 | 248 |
| B3 | I | 1246 | 1.4 | 830 | 663 | 60 | 700 | 72 |
| B4 | I | 1134 | 2.8 | 900 | 738 | 60 | 960 | 164 |
| B5 | II | 1145 | 1.6 | 817 | 547 | 60 | 913 | 215 |
| B6 | III | 1233 | 2.2 | 809 | 681 | 60 | 780 | 293 |

| | Step (2) | | Step (3) | | | | |
|---|---|---|---|---|---|---|---|
| | Dew point of annealing atmosphere (° C.) | Volume content of $H_2$ (%) | Cooling rate (° C./s) | Temperature of the strip steel into molten zinc bath (° C.) | Ternperature of galvanizing zinc (° C.) | Mass percentage of Al in galvanizing zinc (%) | Mass percentage of Mn in galvanizing zinc (%) |
| A1 | −15 | 5 | 32 | 465 | 460 | 0.2 | 0 |
| A2 | −10 | 5 | 35 | 465 | 460 | 0.2 | 0 |
| A3 | −5 | 5 | 50 | 465 | 460 | 0.2 | 0 |
| A4 | 0 | 5 | 32 | 465 | 460 | 0.2 | 0 |
| A5 | 10 | 5 | 43 | 465 | 460 | 0.2 | 0 |
| A6 | 20 | 10 | 38 | 465 | 460 | 0.2 | 0 |
| A7 | −10 | 5 | 35 | 465 | 460 | 0.2 | 0 |
| A8 | −10 | 2.5 | 25 | 465 | 460 | 0.2 | 0 |
| A9 | −10 | 15 | 22 | 480 | 460 | 0.2 | 0 |
| A10 | −10 | 11 | 68 | 470 | 470 | 6 | 3 |
| A11 | −10 | 5 | 53 | 450 | 438 | 2 | 1.5 |
| A12 | −5 | 5 | 52 | 450 | 445 | 1 | 1 |
| A13 | 0 | 3 | 23 | 465 | 460 | 0.2 | 0 |
| A14 | −10 | 3 | 64 | 465 | 460 | 0.2 | 0 |
| A15 | −10 | 3 | 62 | 470 | 460 | 0.2 | 0 |
| A16 | −5 | 3 | 61 | 470 | 460 | 0.2 | 0 |
| B1 | −40 | 5 | 52 | 465 | 460 | 0.2 | 0 |
| B2 | −20 | 5 | 43 | 465 | 460 | 0.2 | 0 |
| B3 | −10 | 5 | 88 | 465 | 460 | 0.2 | 0 |
| B4 | −5 | 10 | 72 | 465 | 460 | 0.2 | 0 |
| B5 | −40 | 5 | 31 | 470 | 460 | 0.2 | 0 |
| B6 | −30 | 5 | 73 | 470 | 460 | 0.2 | 0 |

Figure 3:
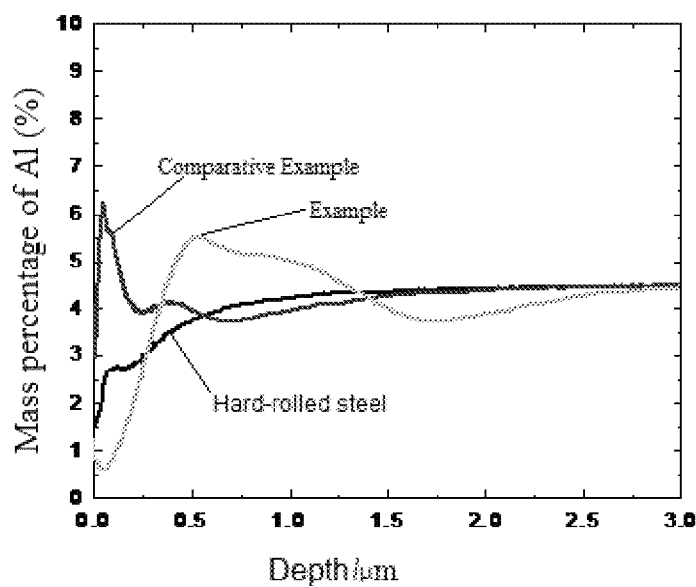
FIG. 3 is a graph showing the depth distribution curve of element Al in the range of 0~5 μm of the steel surface before hot dipping after annealing in hard-rolled steel, Comparative Example B1 and Example A4.

FIG. 3 is a graph showing the depth distribution curve of element Al in the range of 0~5 μm of the steel surface before hot dipping after annealing in hard-rolled steel, Comparative Example B1 and Example A4. As can be seen from the Figure, the strip surface of Comparative Example B1 is rich in Al, corresponding to the $Al_2O_3$ film on the strip steel surface after annealing; the Al enrichment in the strip steel surface of Example A4 disappeared, while the element Al enrichment is present in the internal oxidized layer, indicating that the external oxidation has been converted to internal oxidation.

Figure 4:
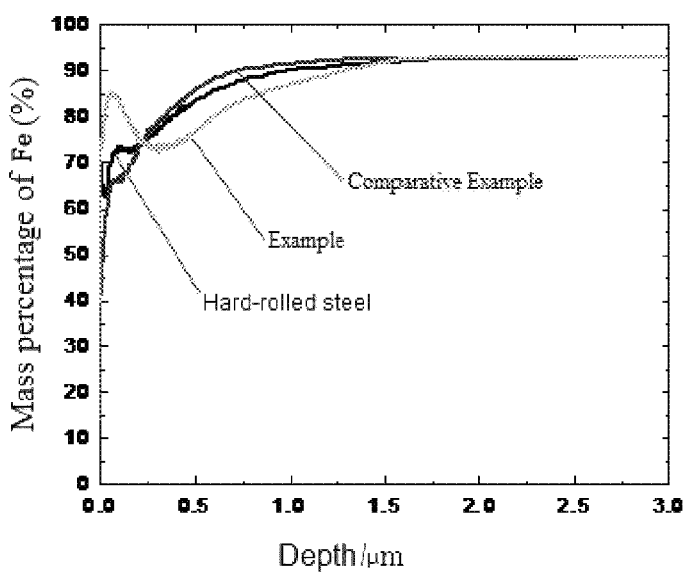
FIG. 4 is a graph showing the depth distribution curve of element Fe in the range of 0~5 μm of the steel surface before hot dipping after annealing in hard-rolled steel, Comparative Example B1 and Example A4.

FIG. 4 is a graph showing the depth distribution curve of element Fe in the range of 0~5 μm of the steel surface before hot dipping after annealing in hard-rolled steel, Comparative Example B1 and Example A4, wherein the strip steel surface of Comparative Example B1 has a low Fe content, while the iron particle layer of the Example has a sharp Fe peak.

Figure 5:
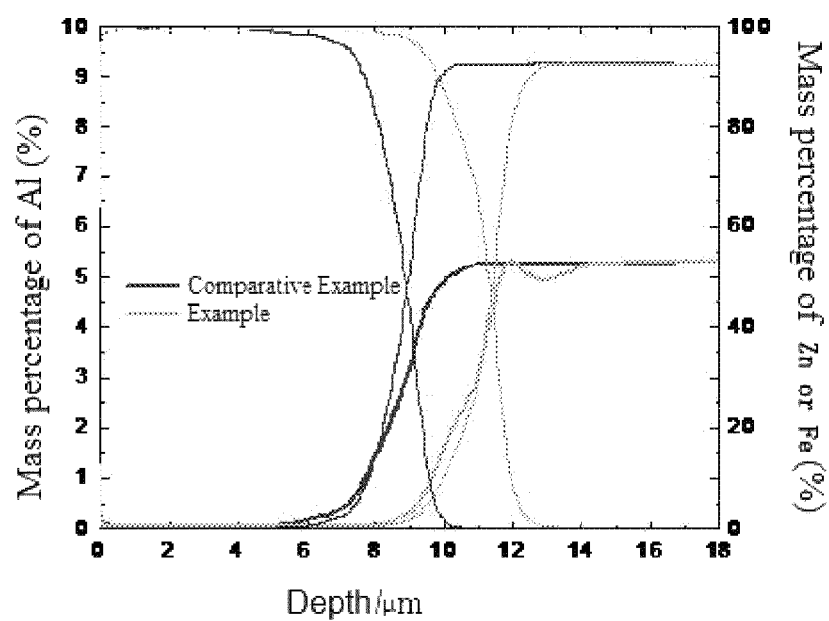
FIG. 5 is a graph showing the depth distribution curve of three elements of Al, Fe, and Zn of Comparative Example B1 and Example A4 after the hot dipping of Zn-0.2% Al.

FIG. 5 is a graph showing the depth distribution curve of three elements of Al, Fe, and Zn of Comparative Example B1 and Example A4 after the hot dipping of Zn-0.2% Al zinc bath, wherein, in the Comparative Example B1, element Al in the coating layer/substrate interface smoothly transitions without peak change, while in Example A4, element Al in the coating layer/substrate interface shows a peak, indicating that Comparative Example B1 did not form the first inhibition layer and the second inhibition layer on the coating layer/substrate interface, while Example A4 formed effective first inhibition layer and second inhibition layer on the coating layer/substrate interface, resulting in poor galvanizability and coating layer adhesion of Comparative Example B1.

Table 3 lists the performance parameters of the low-density hot dip galvanized steels of Examples A1-A16 and of the conventional steel sheets of Comparative Examples B1-B6.

Wherein, the galvanizability is determined by directly observing the appearance of the strip steel after cladding with the naked eye. If the surface has no obvious uncoated iron, the galvanizability is good (indicated by ○); if the surface has obvious uncoated iron, the galvanizability is poor (indicated by X).

The adhesion of the coating layer is determined by the following method: taking a sample having a length of 200 mm and a width of 100 mm from the strip steel, bending it 180 degrees, then flattening, and sticking the bending position with a tape. If no zinc layer is adhered on the tape or the surface of the coating layer on the bending surface adhered by the tape is not fluffed, the coating layer adhesion is good (indicated by ○); If the coating layer is adhered on the tape or the surface of the coating layer on the bending surface adhered by the tape is fluffed, the coating layer adhesion is poor (indicated by X).

TABLE 3

| | Density (kg/m³) | Elongation (%) | Tensile strength (MPa) | Galvanizability | Coating layer adhesion |
|---|---|---|---|---|---|
| A1 | 7340 | 25 | 838 | ○ | ○ |
| A2 | 7340 | 32 | 831 | ○ | ○ |
| A3 | 7340 | 33 | 844 | ○ | ○ |
| A4 | 7340 | 25 | 823 | ○ | ○ |
| A5 | 7340 | 28 | 858 | ○ | ○ |
| A6 | 7340 | 34 | 852 | ○ | ○ |
| A7 | 7340 | 29 | 843 | ○ | ○ |
| A8 | 7340 | 33 | 828 | ○ | ○ |
| A9 | 7340 | 29 | 830 | ○ | ○ |
| A10 | 7340 | 27 | 851 | ○ | ○ |
| A11 | 7340 | 27 | 821 | ○ | ○ |
| A12 | 7340 | 26 | 848 | ○ | ○ |
| A13 | 7150 | 27 | 839 | ○ | ○ |
| A14 | 7150 | 28 | 850 | ○ | ○ |
| A15 | 7280 | 33 | 850 | ○ | ○ |
| A16 | 7280 | 26 | 836 | ○ | ○ |
| B1 | 7340 | 28 | 825 | X | X |
| B2 | 7340 | 27 | 851 | X | X |
| B3 | 7340 | 32 | 848 | X | X |
| B4 | 7340 | 35 | 849 | ○ | X |
| B5 | 7340 | 30 | 836 | X | X |
| B6 | 7280 | 27 | 836 | X | X |

As can be seen from Table 3, all of the Examples A1-A16 have densities of less than 7500 kg/m³, elongations of more than 25% and tensile strengths of more than 800 MPa, and the galvanizability and coating layer adhesion of Examples A1-A16 are superior to those of Comparative Examples B1-66.

The reasons are as follows: since the surface of the substrate has an iron particle layer in the Examples, when the strip steel is immersed in the zinc bath, Al and Fe in the coating layer firstly react to form a inhibition layer; on the contrary, since the surface of the substrate does not form an effective layer of iron particles but a continuous dense $Al_2O_3$ oxide film in the Comparative Examples, which hinders the reaction of Al in the zinc bath with the Fe of the substrate, and thus an effective inhibition layer is not formed.

It is to be noted that the above description is only specific Examples of the present invention, and it is obvious that the present invention has many similar modifications and is not limited to the above Examples. All modifications derived or conceived by those skilled in the art from the disclosure of the present invention should fall within the scope of the present invention.

The invention claimed is:

1. A low-density hot dip galvanized steel, comprising a steel substrate located at a core portion of the steel and a coating layer located on a surface of the steel substrate; wherein:
    an interface layer is disposed between the steel substrate and the coating layer, the interface layer comprises an iron particle layer, iron particles dispersed on the steel substrate and covering the steel substrate are disposed in the iron particle layer, the iron particles are covered by a first inhibition layer;
    the low-density hot dip galvanized steel contains element Al in a mass percentage of 3.0% to 7.0%;
    a density of the low-density hot dip galvanized steel is less than 7500 kg/m³, wherein the surface of the low-density hot dip galvanized steel includes portion covered with the iron particles and portion not covered with the iron particles; and
    the iron particles have a particle size of 0.1~5 μm.

2. The low-density hot dip galvanized steel according to claim 1, wherein, the steel substrate has an internal oxidized layer in a portion adjacent to the iron particle layer, the internal oxidized layer contains oxides of Al.

3. The low-density hot dip galvanized steel according to claim 2, wherein, the internal oxidized layer further contains oxides of Mn.

4. The low-density hot dip galvanized steel according to claim 2, wherein the internal oxidized layer has a thickness of 0.2~10 μm.

5. The low-density hot dip galvanized steel according to claim 2, wherein, oxides of the internal oxidized layer exist in grain boundary and inside the grain.

6. The low-density hot dip galvanized steel according to claim 1, wherein, the interface layer has a thickness of 0.1~5 μm.

7. The low-density hot dip galvanized steel according to claim 1, wherein, the iron particles cover 30% or more of a surface area of the steel substrate.

8. The low-density hot dip galvanized steel according to claim 1, wherein, the maximum space between adjacent iron particles is no more than 10 times the average particle size of the iron particles.

9. The low-density hot dip galvanized steel according to claim 1, wherein, a portion not covered by iron particles on the surface of the steel substrate is covered by a second inhibition layer.

10. The low-density hot dip galvanized steel according to claim 9, wherein, the thickness of the second inhibition layer is less than the thickness of the first inhibition layer.

11. The low-density hot dip galvanized steel according to claim 9, wherein, the second inhibition layer contains elements Fe, Al, and Zn.

12. The low-density hot dip galvanized steel according to claim 1, wherein, the first inhibition layer contains elements Fe, Al, and Zn.

13. The low-density hot dip galvanized steel according to claim 1, wherein, microstructures of the steel substrate are ferrite and residual austenite.

14. The low-density hot dip galvanized steel according to claim 13, wherein, a phase ratio of the residual austenite is 6~30%.

15. The low-density hot dip galvanized steel according to claim 13, wherein, a mass percentage of element C in the residual austenite is not less than 0.8%.

16. The low-density hot dip galvanized steel according to claim 1, wherein, mass percentages of chemical elements of the steel substrate are: C: 0.25~0.50%, Mn: 0.25~4.0%, Al: 3.0~7.0%, and the balance being Fe and other unavoidable impurities.

17. The low-density hot dip galvanized steel according to claim 16, wherein, the low-density hot dip galvanized steel has an elongation of more than 25% and a tensile strength of more than 800 MPa.

18. The low-density hot dip galvanized steel according to claim 1, wherein, the coating layer has a thickness of 5~200 μm.

19. A method for manufacturing the low-density hot dip galvanized steel of claim 1, comprising the steps of:
(1) manufacturing a strip steel;
(2) continuous annealing of the strip steel directly: heating to a soaking temperature of 750-950° C. and then holding 30-600 s, wherein dew point of annealing atmosphere is −15° C.~20° C.;
(3) hot dipping.

20. The method for manufacturing a low-density hot dip galvanized steel according to claim 19, wherein, in the step (1),
a casting slab is heated at 1000~1250° C. with a holding time of 0.5~3 h and a finishing rolling temperature of 800-900° C. to form a hot-rolled sheet, then the hot-rolled sheet is coiled at 500~750° C. to form a hot-rolled coil, and the hot-rolled coil is uncoiled and then subjected to pickling and cold rolling, wherein cold rolling reduction is 30~90%.

21. The method for manufacturing a low-density hot dip galvanized steel according to claim 19, wherein, in the step (2), atmosphere of a heating section and a holding section is a mixed gas of $N_2$ and $H_2$, wherein volume content of $H_2$ is 0.5~20%.

22. The method for manufacturing a low-density hot dip galvanized steel according to claim 19, wherein, in the step (3), the strip steel after continuous annealing is cooled to a temperature of strip steel entering into a molten zinc bath, wherein cooling rate is 1~150° C./s, and the temperature of strip steel entering into a molten zinc bath is 0~20° C. higher than a temperature of a zinc bath; the strip steel is then immersed in the zinc bath of the molten zinc bath for hot dipping; wherein, the temperature of the zinc bath is 30~60° C. higher than the melting point of the components of the selected zinc bath.

23. The method for manufacturing a low-density hot dip galvanized steel according to claim 22, wherein, in the step (3), the mass percentage of the components in the zinc bath is: 0.10≤Al≤6%, 0≤Mg≤5%, and the balance being Zn and other unavoidable impurities.

* * * * *